United States Patent
Krause

(10) Patent No.: US 6,854,711 B2
(45) Date of Patent: Feb. 15, 2005

(54) ASSEMBLY CONSISTING OF A HOUSING AND A FLAP UNIT

(75) Inventor: Reinhard Krause, Marktredwitz-Brand (DE)

(73) Assignee: TRW Automotive Electronics & Components GmbH & Co. KG, Radolfzell (DE)

(*) Notice: Subject to any disclaimer, the term of this patent is extended or adjusted under 35 U.S.C. 154(b) by 43 days.

(21) Appl. No.: 10/350,201

(22) Filed: Jan. 23, 2003

(65) Prior Publication Data

US 2003/0136936 A1 Jul. 24, 2003

(30) Foreign Application Priority Data

Jan. 24, 2002 (DE) .......................... 102 02 760

(51) Int. Cl.[7] ................................. F16K 3/22
(52) U.S. Cl. ................................. 251/305; 137/15.25
(58) Field of Search ................... 251/305, 368; 137/15.25, 595, 601.05, 601.08, 601.09, 601.17, 607, 315.22, 315.24, 883, 625.18

(56) References Cited

U.S. PATENT DOCUMENTS

| | | | | |
|---|---|---|---|---|
| 3,604,458 A | * | 9/1971 | Silvey | 137/601.11 |
| 3,972,348 A | * | 8/1976 | Hagar | 137/601.09 |
| 4,895,654 A | * | 1/1990 | Burrows | 210/110 |
| 5,167,252 A | * | 12/1992 | Rogne | 137/375 |
| 5,875,745 A | | 3/1999 | Watanabe et al. | |
| 5,875,758 A | | 3/1999 | Fujita | |
| 6,263,917 B1 | | 7/2001 | Evans | |

FOREIGN PATENT DOCUMENTS

| | | |
|---|---|---|
| DE | 7918999 | 10/1979 |
| DE | 3340122 A1 | 5/1985 |
| DE | 4404865 A1 | 8/1995 |
| DE | 19615438 | 1/1997 |
| DE | 19735133 A1 | 3/1998 |
| DE | 10053509 A1 | 5/2001 |
| EP | 0702175 A1 | 3/1996 |
| JP | 58219031 | 12/1983 |
| JP | 200123479 | 8/2001 |
| JP | 2001-241556 | 9/2001 |

* cited by examiner

*Primary Examiner*—Edward K. Look
*Assistant Examiner*—John K. Fristoe, Jr.
(74) *Attorney, Agent, or Firm*—Tarolli, Sundheim, Covell & Tummino L.L.P.

(57) ABSTRACT

An assembly consists of a housing and a flap unit. The housing and the flap unit are each one-piece injection-molded parts and the flap unit is mounted in the housing. The flap unit has at least two flap elements and a connection section arranged between each two flap elements. The connection section has a compensation element that can compensate for shrinkage-related length changes, in particular of the connection section.

6 Claims, 5 Drawing Sheets

ASSEMBLY CONSISTING OF A HOUSING AND A FLAP UNIT

TECHNICAL FIELD

The invention relates to an assembly consisting of a housing and a flap unit.

BACKGROUND OF THE INVENTION

In a conventional assembly, the housing and the flap unit are each one-piece injection-molded parts and the flap unit is mounted in the housing, the flap unit having at least two flap elements and a connection section arranged between each two flap elements.

Such assemblies serve as control elements for gaseous or liquid media which are referred to below as fluids. The flap unit is mounted so as to pivot in the housing in such a way that a maximum throughput of the fluid is possible in an open position of the flap unit relative to the housing, and a minimal throughput or a blockage of the fluid is possible in a closed position. Such assemblies can be used, for example, in heating, ventilation and climate control systems, especially those installed in vehicles, in order to control the flow of fresh air or warm air.

It would be desirable to configure the two components of the assembly as one-piece injection-molded parts of which one is non-detachably integrated into the other. In fact, it is fundamentally possible to allow an injection-molded part to harden in a second one in such a way that the two injection-molded parts can move relative to each other. Such a method is known, for example, from DE 33 40 122 A1. In this method, a first injection-molded part is manufactured in a first mold. Then the first injection-molded part is removed from the first mold and placed into a second mold. Here, the first injection-molded part hardens to such an extent and acquires so much strength that an injection-molding material can be injected into the second mold, thus, for example, filling an opening of the first injection-molded part and hardening in it to form a second injection-molded part. The second injection-molded part can then move in the first injection-molded part, but it can be non-detachably connected to it. In any case, the essential advantage is achieved that the second injection-molded part does not have to be mounted onto the first one.

Since the first injection-molded part is already partially solidified before the second injection-molded part is made, the first injection-molded part already has undergone part of its unavoidable shrinkage before the material for the second injection-molded part is injected. The result of this can be that the second injection-molded part jams against the first injection-molded part when the second injection-molded part in turn shrinks. In particular with an assembly of the type mentioned above, the shrinkage of the connection section between two adjacent flaps causes the flaps to jam in the housing.

The objective of the invention is to improve an assembly of the type described above in such a way that the flap unit can be formed in the housing without impairing the mobility of the flap unit relative to the housing.

BRIEF SUMMARY OF THE INVENTION

According to the invention, an assembly consists of a housing and a flap unit. The housing and the flap unit are each one-piece injection-molded parts and the flap unit is mounted in the housing. The flap unit has at least two flap elements and a connection section arranged between each two flap elements. The connection section has a compensation element that can compensate for shrinkage-related length changes, in particular of the connection section. To put it in general terms, the invention is based on enabling a length compensation of the connection section between two adjacent flaps by means of the compensation element that is made in one piece with the connection section. The compensation element yields elastically when the connection element shrinks, resulting in only a slight pretension between two adjacent flaps of the flap unit. The friction resulting from the pretension is negligible. The compensation by the compensation element is so great that the gating for the flap unit can be arranged on the mold without taking the shrinkage of the connection section into account.

Advantageous embodiments of the invention will be apparent from the subordinate claims.

DETAILED DESCRIPTION OF THE PREFERRED EMBODIMENT

Figure 1:
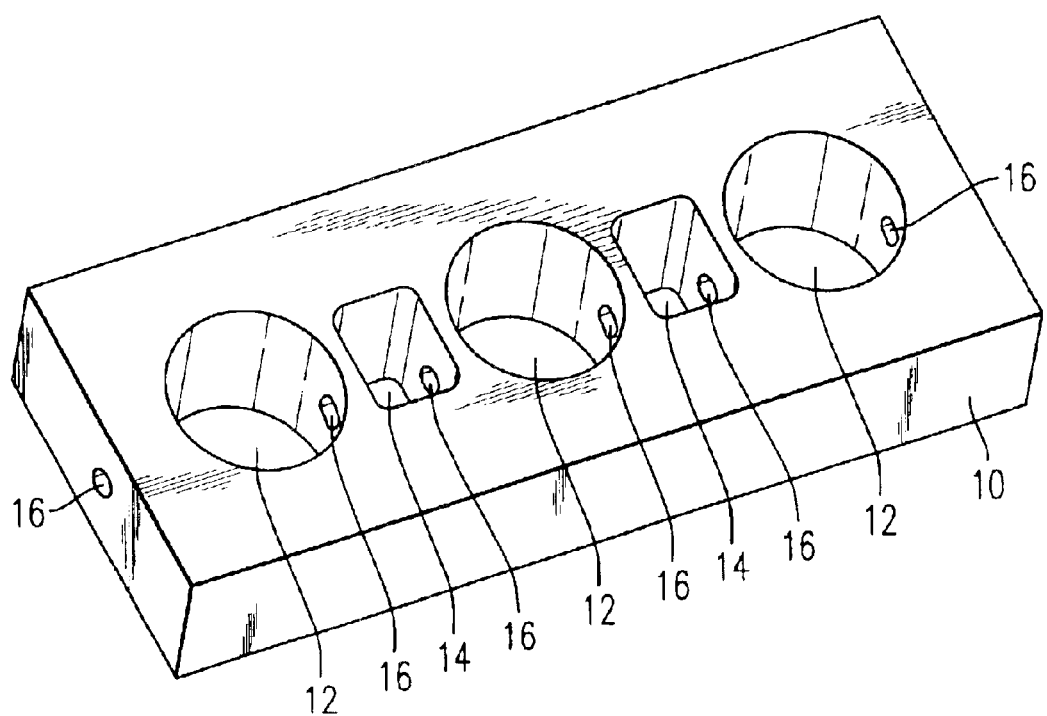
FIG. 1 is a perspective view of the housing.
Figure 2:
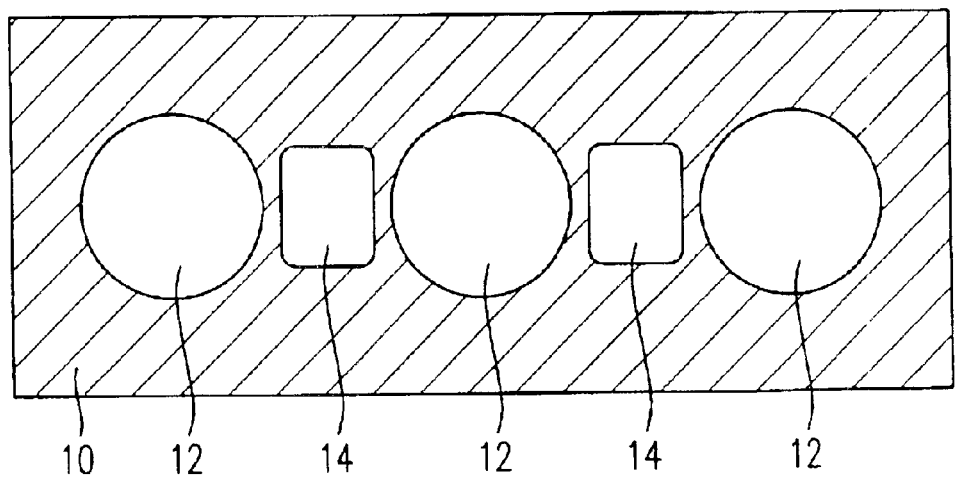
FIG. 2 is a sectional view of the housing.

FIGS. 1 and 2 show the housing 10 with several flap openings 12, several cutouts 14 and a passage opening 16. The flap openings 12 have a circular cross-section, and the cutouts have an approximately rectangular cross-section. In each case, one cutout 14 is arranged between two flap openings 12. The passage opening 16 is interrupted by the flap openings 12 and the cutouts 14.

Figure 3:
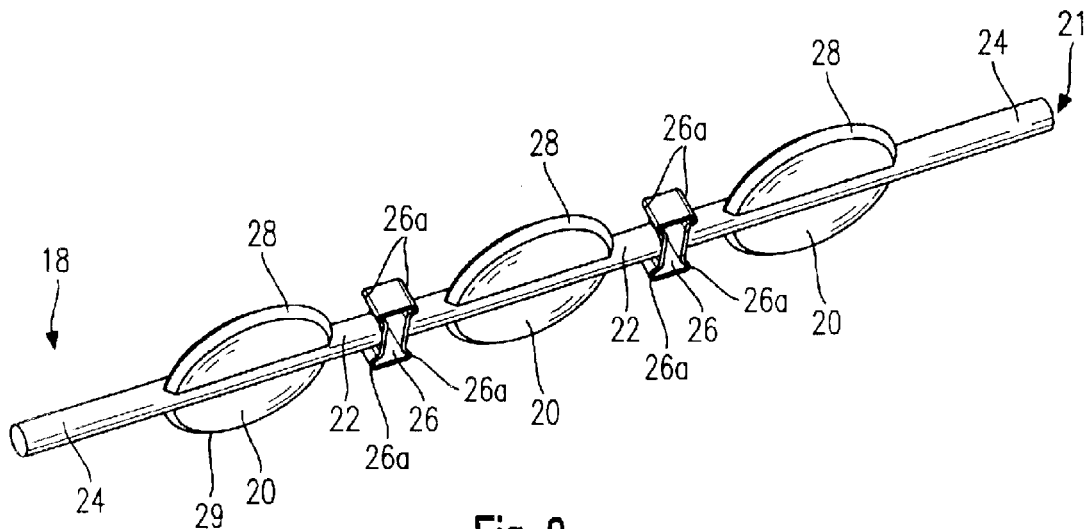
FIG. 3 is a perspective view of a flap unit.
Figure 4:
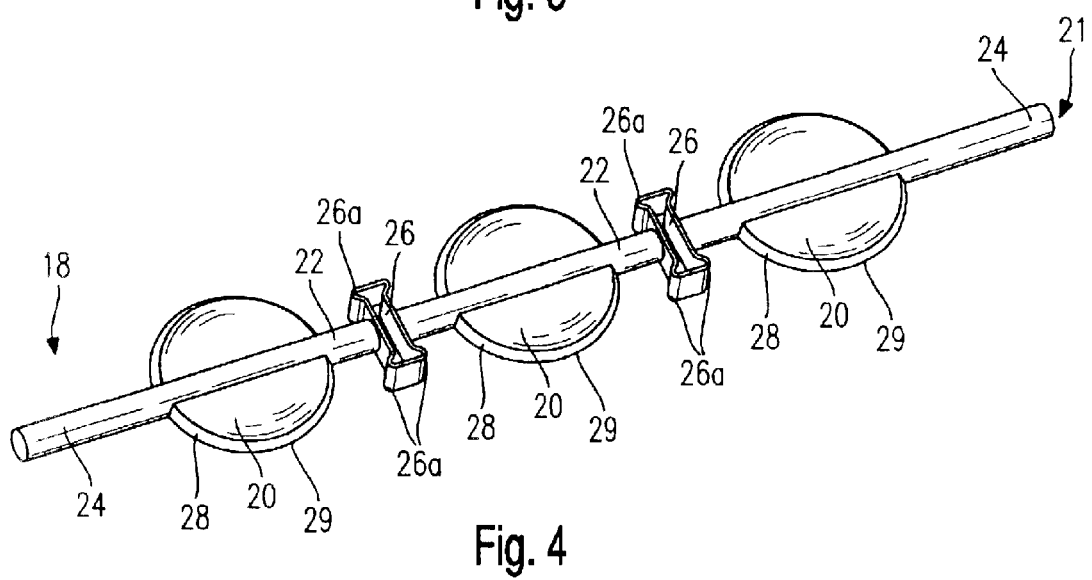
FIG. 4 is another perspective view of a flap unit.
Figure 5:
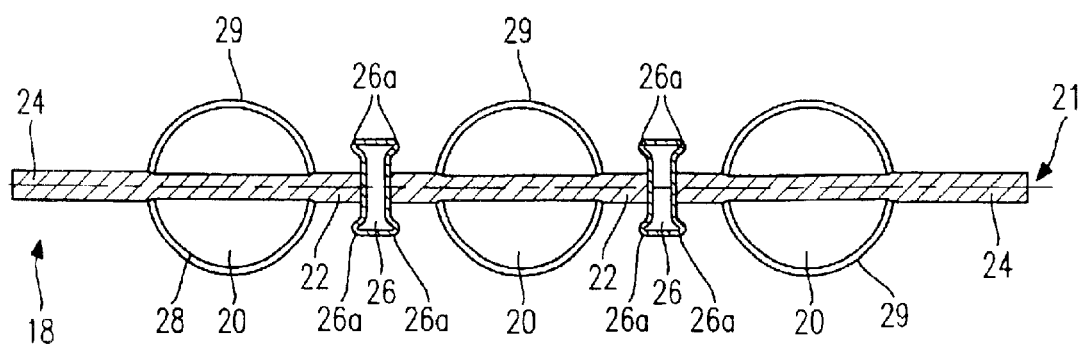
FIG. 5 is a sectional view of the flap unit.

FIGS. 3, 4 and 5 show a flap unit 18 with flap elements 20 and a shaft 21. The shaft 21 has connection sections 22, end sections 24 as well as compensation elements 26.

The connection sections 22 of the shaft 21 are rod-shaped and are each arranged between two flap elements 20. The compensation element 26 is situated centered on the corresponding connection section 22. It is configured as an essentially rectangular frame element that has bulges 26a on each of the corners. The vertices of the bulges—as seen in a direction parallel to the lengthwise axis of the connection elements—extend beyond the longer sides of the frame. To put it differently, the distance between the longer sides of the frame is smaller than the total width of the frame. As seen in the radial direction, the bulges do not extend beyond a distance from the lengthwise axis that is defined by the shorter sides of the frame.

Figure 11:
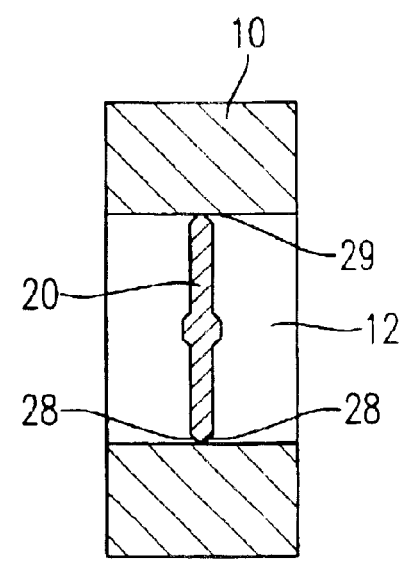
FIG. 11 is a sectional view of the assembly along section XI—XI of FIG. 8.

The flap elements 20 are disk elements with a circular cross-section. The shaft 21 and the flap elements 20 are each connected to each other in one piece on a diameter line of the flap element. The flap elements all have the same alignment, that is to say, all of the disk elements lie in a shared plane. The outer rim of each flap element 20 has a bevel 28, which forms a sharp flap edge 29 (also see FIG. 11).

FIGS. 6 through 11 show an assembly 30 that consists of the housing 10 and the flap unit 18. As can be seen best in FIGS. 8 and 9, the flap unit 18 is mounted with the end sections 24 of the shaft 21 in the extreme right-hand and left-hand sections of the passage opening 16 of the housing 10 (as seen relative to FIGS. 8 and 9), whereas the connections sections 22 are mounted in the sections of the passage opening 16 situated between the flap elements 20. The flap elements 20 are each located in the flap openings 12. The compensation elements 26 are arranged in such a way that they lie in the cutouts 14.

Figure 6:
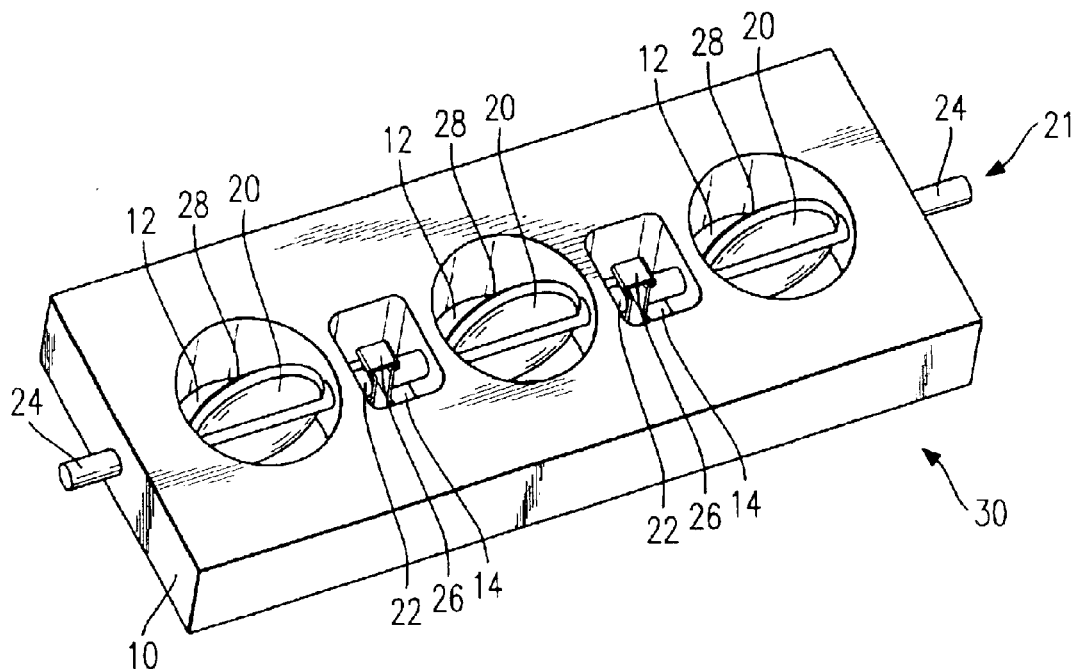
FIG. 6 is a perspective view of the assembly consisting of the housing and the flap unit, whit the flap unit in an open position.
Figure 7:
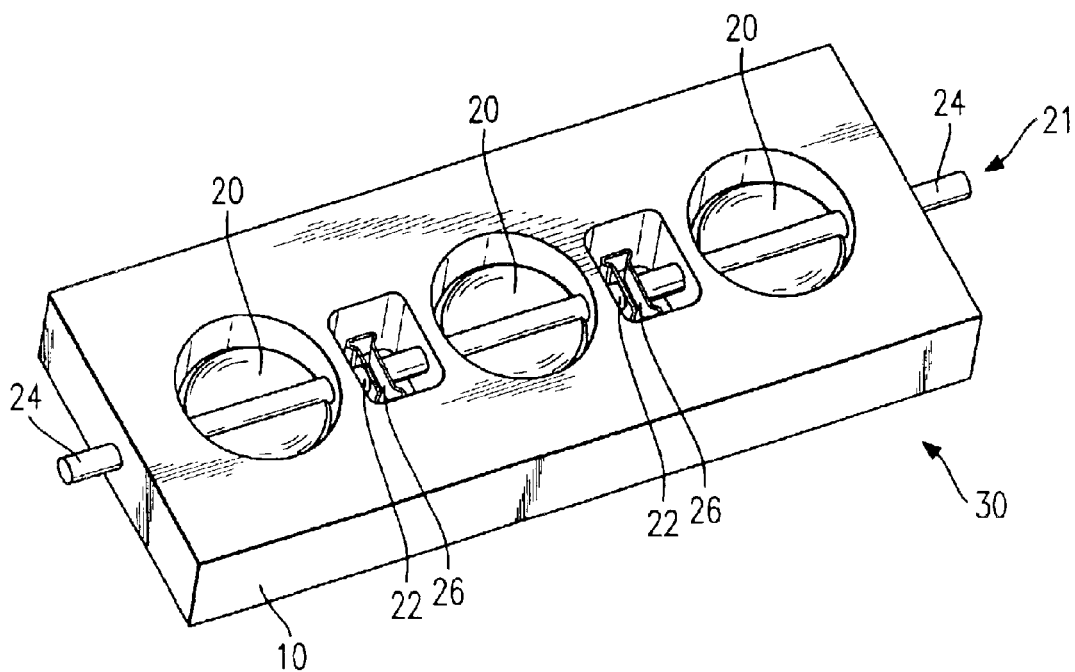
FIG. 7 is another perspective view of the assembly, the flap unit being in a closed position.
Figure 8:
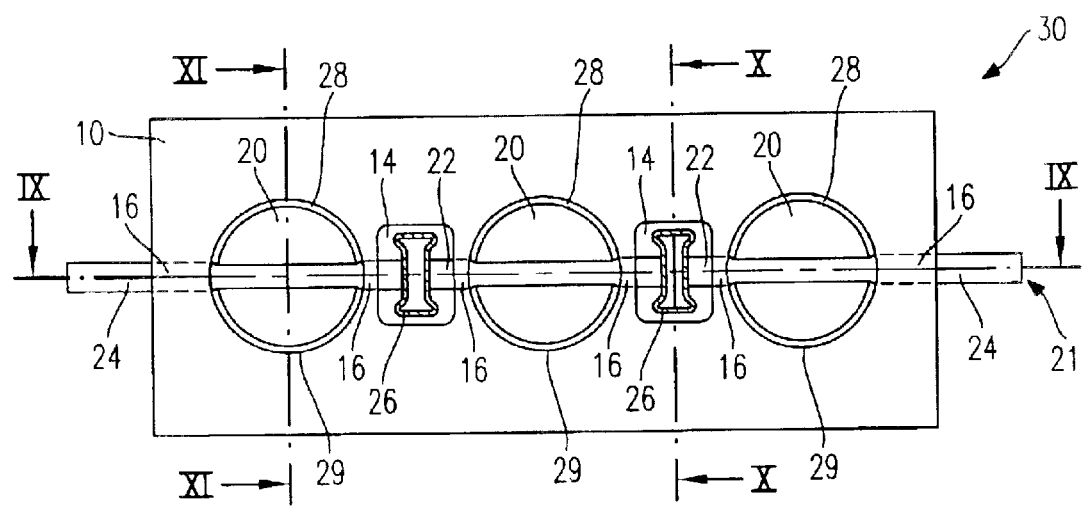
FIG. 8 is a sectional view of the assembly, the flap unit being in the closed position.
Figure 9:
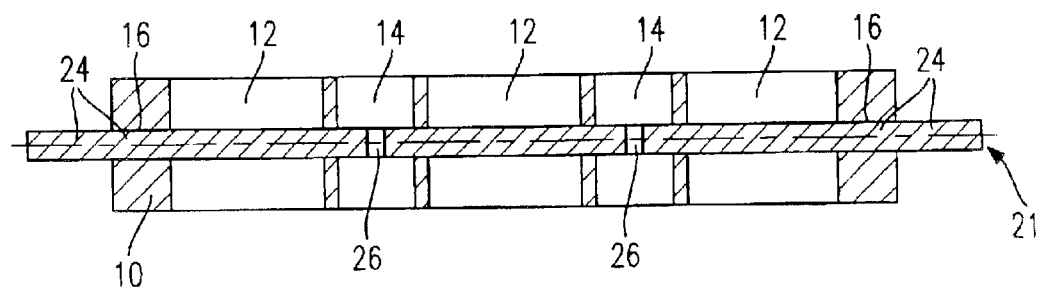
FIG. 9 is a sectional view of the assembly along section IX—IX of FIG. 8.
Figure 10:
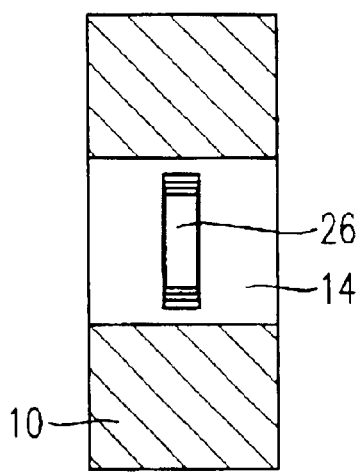
FIG. 10 is a sectional view of the assembly along section X—X of FIG. 8.

FIG. 6 shows an assembly 30 with the flap elements 20 in the open position. In this position, the flap elements are approximately perpendicular to the middle axis of the flap openings so that there is a maximum flow cross-section.

FIGS. 7 through 11 show the assembly with the flap elements in the closed position. As can be seen especially clearly in FIG. 11, the flap element 20 with the flap edge 29 in the flap openings 12 lies tightly against the housing 10 so that no flow is possible.

The compensation elements 26 can compensate for manufacturing tolerances of the flap unit 18, for example, in the dimensions of the connection sections or of the housing 10, so that adjacent flap elements 20 cannot jam relative to each other in the housing. The bulges 26a ensure that the frame has a relatively low spring constant under loads that act along the lengthwise axis of the connection sections. As a result, any tolerances that are compensated for by a width change of the frame, that is to say, changes in the dimension in a direction parallel to the lengthwise axis of the connection sections, only lead to a slight lengthwise force which, in turn, only causes a slight friction of the flap unit in the housing. Regardless of the low stiffness of the frame under load in the lengthwise direction, it has high torsional stiffness, which ensures that all of the flap elements always have the same alignment.

The assembly described can be manufactured with the method according to DE 33 40 122 A1. Here, the housing 10 is first produced as an injection-molded part in a first mold. It is then removed from the first mold and placed into a second mold. In the process, the housing 10 cools off and shrinks. Now the flap unit 18 is injected into the housing 10 in the second mold. The assembly thus produced is then taken out of the second mold. The shrinkage of the flap unit 18 and in particular of the connection sections then takes place in the housing. Without the compensation elements 26, this would cause the flap elements 20 to jam in the flap openings 12. The compensation elements 26 compensate for the distance between the flap elements 20 to such an extent that they can be freely swiveled in the flap openings 12.

As a matter of principle, the flap unit can also be injection-molded first and then the housing can be injected in a later step.

What is claimed is:

1. An assembly comprising a housing and a flap unit, said housing and said flap unit being each one-piece injection-molded parts and said flap unit being mounted in said housing, said flap unit having at least two flap elements arranged on a common axis and a connection section arranged between each two flap elements, said connection section having a compensation element that compensates for shrinkage-relayed length changes of said connection section.

2. The assembly according to claim 1, wherein said connection section is essentially rod-shaped and said compensation element is arranged essentially in a middle of said connection section.

3. The assembly according to claim 1, wherein said compensation element is a spring element.

4. The assembly according to claim 1, wherein said compensation element is essentially configured as a rectangular frame element.

5. The assembly according to claim 4, wherein said compensation element has bulges.

6. The assembly according to claim 1, wherein said housing has at least one passage opening in which said flap unit is mounted.

* * * * *